May 26, 1936. C. L. EKSERGIAN 2,042,445

BRAKE

Filed May 27, 1932

INVENTOR
Carolus L. Eksergian,
BY
John P. Barbot
ATTORNEY

Patented May 26, 1936

2,042,445

UNITED STATES PATENT OFFICE 2,042,445

BRAKE

Carolus L. Eksergian, Detroit, Mich., assignor to Budd Wheel Company, Philadelphia, Pa., a corporation of Pennsylvania Application May 27, 1932, Serial No. 613,910

5 Claims. (Cl. 188—79)

The invention relates to braking systems for vehicles, and particularly to multiple-unit systems embodying multiple brake drums and/or multiple brake elements such as shoes or bands.

There has been a very decided trend of late toward the use of smaller diameter wheels, incident to the general effort to improve the riding qualities of automobiles by increasing the amount of rubber used, particularly in tires. While the tread diameters of tires have been fairly consistently maintained in order that road speeds may be the same without increased motive power, the rim diameters of the tires have been decreased, thus making possible enlarged tire sections. The smaller rims and wheels have necessarily limited the space available for running gear such as brakes, drums, and steering mechanisms. With the decrease in brake drum diameters, some added provision has to be made to maintain the effective braking area. Several proposals have been made in the past, directed to wider drums and brake shoes; to multiple drums and single shoes; to multiple shoes and single drums; and, to multiple drums and shoes.

The prime object of the invention is a provision of improved means for operating multiple brake elements. A further object, incidental to the main object, is the equalization of brake application, whereby in a multiple system, the brakes will be applied evenly. Other objects and advantages relate to simplicity and utility of design.

The main objects of my invention have been obtained by providing common means for operating a plurality of brake elements, and by so arranging these means that they may be effectively used to equalize the application of the brakes.

Figure 1:
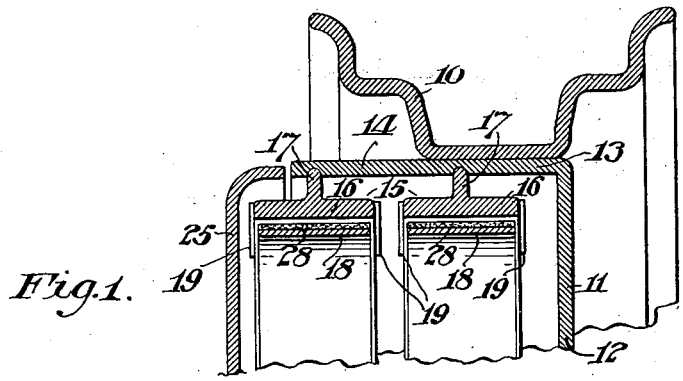
Figure 2:
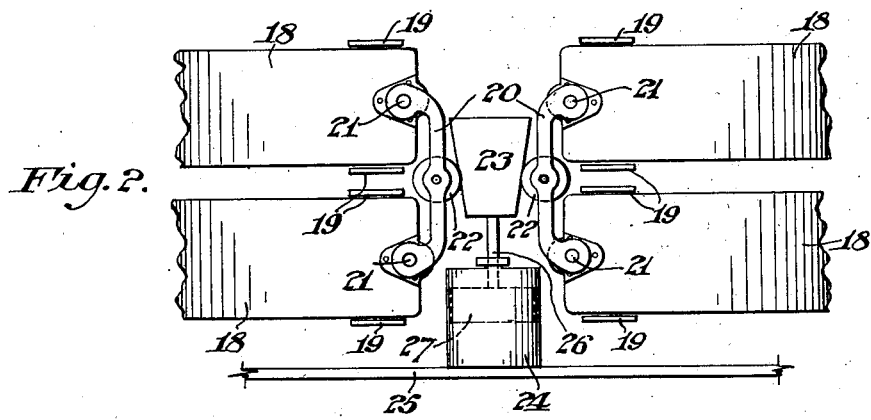
Figure 3:
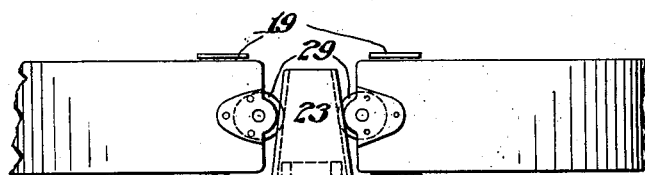
Figure 4:
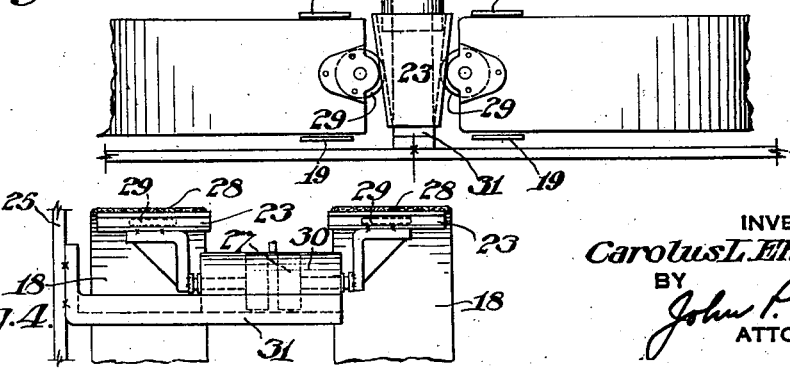

Other objects and advantages will be apparent after a reading of the sub-joined specifications in the light of the attached drawing, in which Figure 1 is a vertical cross section through a vehicle wheel embodying a form of my invention, Fig. 2 is a partial plan view, showing multiple brake elements, actuated in accordance with my invention, Fig. 3 is a view similar to Figure 2 showing a modified form of my invention, Fig. 4 is an elevational view of the operating mechanism shown in Figure 3.

Referring now to the drawing reference numeral 10 refers to a drop center rim, supported by a cylindrical wheel body 11, consisting of a radially extending body portion 12 through which the wheel, as a whole, is secured to the usual hub, not shown, and an axially extending portion 13, which supports the rim 10 and is extended axially inwardly of the wheel as at 14. This axial extension 14 serves as a support for a single brake drum, or a plurality of brake drums 15. Brake drums of this type, comprising a cylindrical main body 16, and an annular symmetrically disposed rib 17 are disclosed in the patents to Emil A. Nelson No. 1,750,682, dated March 18, 1930 and Reissue No. 18,176, dated September 1, 1931. While the brake drums shown are of the type shown in the above mentioned patents, it should be understood that other types of drums may be used equally as well, and that my invention is directed to the manner of actuating multiple brake elements, rather than to the particular brake drums used.

I have preferred to illustrate a pair of identical drums 15 mounted within the axially extending portions 13 and 14 of wheel body 11. The combined braking areas of these drums may be equal to or greater than the braking area of a correspondingly larger drum of smaller width. Although a single drum of increased width may be used, I have preferred to illustrate my invention in connection with a pair of drums, for reasons which will be made apparent. In accordance with my invention, I provide a pair of brake elements 18, which may be internally extending shoes or bands, and which will hereinafter be referred to as brake elements. Each of the elements 18 is of a width corresponding to its respective drum 15. A series of radially inwardly extending guide strips 19 is provided on the axial edges of each drum 15, whereby brake elements 18 are maintained in the proper axial relationship with regard to their respective drums.

In accordance with Figure 2 the annular brake elements 18 may be split, their ends being spaced apart a sufficient distance to permit the interposition of actuating means therebetween. A pair of yokes 20, one connecting each pair of axially adjoining ends are pivotally connected to the respective ends, as indicated by numeral 21. The mid-point of each yoke, axially between the brake elements 18, is provided with a roller 22, preferably having its axis in a plane perpendicular to the axis of the elements 18. A wedge member or cam 23 is operatively disposed with respect to the rollers 22 on yokes 20 and is preferably operated transversely of the elements by fluid pressure means, such as an hydraulic cylinder 24, mounted on a backing plate 25. The cam is preferably connected to the cylinder by a screw threaded link 26, the operative length of which may be changed to effect an adjustment of the brakes.

In operation, the admission of fluid to the end of the cylinder 24 nearest cam 23 will cause the piston 27 to draw the cam 23 transversely of the elements 18 and substantially parallel with the plane of rollers 22. The inclined faces of cam 23 will force the respective yokes 20 apart annularly, effecting an application of the brakes, by causing the brake elements 18 to be moved outwardly into contact with drums 15. Inasmuch as the yokes 20 are pivoted to the respective brake elements, any unequalized condition which may exist in the elements 18 and/or the brake drums due to irregularities of wear of the brake lining 28 or other causes will be compensated for by virtue of the fact that one end of the yoke 20 may be pushed farther circumferentially than the other end, depending on the travel required to fully engage each brake element. By provision for such differential movement I have made possible the equalization of brake application by making the applying means compensate for different conditions which would otherwise produce an equalization of the brake effects of two simultaneously operated brake elements. By this provision, equal wear is obtained from linings 28 on the respective elements 18. By far the greatest advantage of such brake application is the combinative result of equally applied forces.

In the modification of Figure 3, simultaneous, equalized operation of the brake elements 18 is attained by providing rollers 29 directly attached to the ends of the respective brake elements 18, and by further providing a pair of wedge members or cams 23, one of which co-acts with each of the pairs of rollers 29 on the ends of the respective brake elements 18. In this embodiment I prefer to operate the cams 23 simultaneously in axially opposite directions by a double acting hydraulic cylinder 30 mounted on backing plate 25 by means of a brake 31. The equalizing effect which is so desirable to obtain, is obtained in this case by the action of two pistons 27 within cylinder 30. The pistons may be back to back or may operate in separate chambers as desired. It will be seen that by applying fluid under pressure to the central portion of the cylinder 30, pistons 27 will be forced axially of elements 18 causing the cams 23 to force the rollers 29 of the ends of the respective brake elements 18 apart and causing the elements to engage drums 15 to arrest the rotation thereof. Inasmuch as the reciprocating movement of each cam 23 and piston 27 is dependent on the other cam 23 and piston 27, the individual brake elements 18 will continue to move into engagement with drums 15 until the braking pressure is equalized. It will of course be understood that the fluid applied to each chamber of the cylinder 30 will be under equal pressure as from an interconnecting fluid pressure system.

The guide strips 19, fixed to the edges of drums 15 and extending radially inwardly beyond the edges of brake elements 18 causes the elements to be maintained in the correct axial relationship with respect to drums 15. Thus the axial component of force caused by the reciprocation of cams 23 is counteracted, and brake elements 18 are allowed to travel only circumferentially.

It will be seen that by the provisions of my invention I have equalized the application of multiple brake elements. This equalization is partly due to the use of hydraulic or other fluid pressure means, particularly in Figure 3, and also to the pivoted yoke arrangement, particularly in Figure 2. I have completely attained the objects of my invention relating to the successful and efficient application of multiple brakes. The other objects, relating to refinements of structure have unquestionably been attained in the most simple and efficient manner possible.

Inasmuch as the main object of the invention is to equalize the application of the brake elements, whether they be brake shoes or brake bands and the modifications herein shown and described are simple illustrations of a few of the possible ways of accomplishing equalized application, I do not wish to be limited to the forms shown, nor by the circumstantial terminology of the specification. In that I have proposed an entirely novel manner of applying multiple brakes, characterized by its high degree of invention, the claims should be read with a breadth of understanding commensurate with the generic spirit of the invention.

What I claim is:

1. A brake system comprising, in combination, a drum, a plurality of brake elements axially spaced on a common axis, cam-receiving means on the ends of said brake elements, cams co-acting with said cam-receiving means whereby to actuate the brake, and means for axially reciprocating said cams.

2. A brake system comprising, in combination, a drum, a plurality of brake elements axially spaced on a common axis, cam-receiveing means on the ends of said brake elements, cams co-acting with said cam-receiving means whereby to actuate the brake and means located axially between said brake elements for axially reciprocating said cams oppositely.

3. A braking system comprising in combination a rotatable braking means, a plurality of relatively fixed brake elements having contact surfaces for frictional engagement with the drum and positioned alongside of each other and axially spaced on a common axis and coacting therewith, said braking elements having actuable end portions adjacent but spaced apart, individual motivating means for each braking element reacting directly between and against adjacent ends, and equalizing power transmitting means common to the motivating means of all the braking elements.

4. A brake system comprising, in combination, a brake drum, a plurality of axially spaced brake elements coaxially mounted, actuating means for said brake elements comprising cam surfaces axially reciprocable, and connections between said cam surfaces and said brake elements for transferring reciprocating motion from said cam surfaces to said brake elements to equalize the actuating force applied to said elements.

5. A braking system comprising, in combination, a brake drum, a plurality of relatively fixed brake elements having contact surfaces for frictional engagement with said drum, and positioned alongside of each other, and axially spaced on a common axis and coacting therewith, said braking elements having actuable end portions adjacent but spaced apart, and brake element operating mechanism including a common power unit for said plurality of brake elements, cams and cam receiving means between said power unit and said brake elements, whereby said power unit may change the relative position of said cams and cam receiving means to move said brake elements.

CAROLUS L. EKSERGIAN.